(12) United States Patent
Kapetanidou et al.

(10) Patent No.: US 12,520,160 B2
(45) Date of Patent: Jan. 6, 2026

(54) REPUTATION-BASED TRUST DETERMINATION METHOD

(71) Applicant: Airbus S.A.S., Blagnac (FR)

(72) Inventors: Ioanna Kapetanidou, Blagnac (FR); Paulo-Jorge Milheiro Mendes, Blagnac (FR); Vassilis Tsaoussidis, Blagnac (FR)

(73) Assignee: Airbus S.A.S., Blagnac (FR)

( * ) Notice: Subject to any disclaimer, the term of this patent is extended or adjusted under 35 U.S.C. 154(b) by 182 days.

(21) Appl. No.: 18/231,923

(22) Filed: Aug. 9, 2023

(65) Prior Publication Data
US 2024/0064522 A1    Feb. 22, 2024

(30) Foreign Application Priority Data
Aug. 18, 2022 (EP) ..................................... 22386057

(51) Int. Cl.
*H04W 12/60* (2021.01)
(52) U.S. Cl.
CPC ................................... *H04W 12/66* (2021.01)
(58) Field of Classification Search
CPC ..... H04W 12/66; H04W 24/02; H04W 24/10; H04W 4/46; H04L 67/1057; H04L 63/00; H04L 63/1425; H04L 63/1433
See application file for complete search history.

(56) References Cited

U.S. PATENT DOCUMENTS

| 11,159,644 | B2 * | 10/2021 | Neishaboori | H04W 72/30 |
| 11,337,071 | B2 * | 5/2022 | Ferreira | H04L 63/1466 |
| 2013/0258878 | A1 * | 10/2013 | Wakikawa | G08G 1/092 |
| | | | | 370/252 |

(Continued)

FOREIGN PATENT DOCUMENTS

| CN | 114519149 | * 5/2022 | G06F 18/2415 |
| CN | 115460255 | * 12/2022 | H04L 67/1057 |

(Continued)

OTHER PUBLICATIONS

Benfriha et al.; "Insiders Detection in the Uncertain IoD using Fuzzy Logic", 2022, IEEE, pp. 1-6. (Year: 2022).*

(Continued)

*Primary Examiner* — Matthew Smithers
(74) *Attorney, Agent, or Firm* — Lerner David LLP

(57) ABSTRACT

A method for determining, onboard a first mobile entity, a level of trust for a second mobile entity in communication with the first mobile entity, and a communication system implementing the method are described. The method includes determining), by the first mobile entity, direct trust data, calculating an initial reputation indicator based on the direct trust data, including a belief value, a disbelief value, an uncertainty value, and a base trust rate, calculating a confidence level based on the belief value, the base trust rate, and the uncertainty value, and determining an updated reputation indicator based on the initial reputation indicator and the confidence level. The base trust rate is indicative of the trust level for data transmitted from an unknown mobile entity not in contact with the first mobile entity. The updated reputation indicator indicates a level of trust of the first mobile entity in the second mobile entity.

12 Claims, 2 Drawing Sheets

(56) References Cited

U.S. PATENT DOCUMENTS

| | | | |
|---|---|---|---|
| 2019/0020657 A1* | 1/2019 | Egner | H04L 9/3297 |
| 2020/0177595 A1* | 6/2020 | Rakshit | G06N 3/08 |

FOREIGN PATENT DOCUMENTS

| | | | | |
|---|---|---|---|---|
| CN | 116976468 | * | 10/2023 | G06N 20/20 |
| EP | 2743726 A1 | * | 6/2014 | G01S 11/06 |

OTHER PUBLICATIONS

Zhao et al.; "An Effective Exponential-Based Trust and Reputation Evaluation System in Wireless Sensor Networks", 2019, IEEEAccess, pp. 33859-33869. (Year: 2019).*

Hasrouny et al.; "Trust model for secure group leader-based communications in VANET", 2018, Springer, pp. 4639-4661. (Year: 2018).*

Barka et al.; "A Trusted Lightweight Communication Strategy for Flying Named Data Networking", Aug. 2018, www.mdpi.com/journal/sensors, pp. 1-18. (Year: 2018).*

Shabut et al.; "Friendship Based Trust Model to secure routing protocols in Mobile Ad hoc Networks", 2014 IEEE, pp. 280-287. (Year: 2014).*

Shabut et al.; "Enhancing Dynamic Recommender Selection Using Multiple Rules for Trust and Reputation Models in MANETs", 2013, Proceedings of IEEE International Conference on Tools with Artificial Intelligence (ICTAI), pp. 654-660. (Year: 2013).*

Yan et al.; "AdChatRep: A Reputation System for MANET Chatting", Sep. 2011, SCI'11, pp. 43-48. (Year: 2011).*

Lahbib et al.; "Trust Based Routing Metric for RPL Routing Protocol in the Internet of Things", Jul. 2020, International Journal on AdHoc Networking Systems (IJANS) vol. 10, No. 1/2/3, pp. 1-17. (Year: 2020).*

Sumra et al.; "Trust Levels in Peer-to-Peer (P2P) Vehicular Network", 2011, IEEE, pp. 708-714. (Year: 2011).*

Ahmadi, M. et al., "Probabilistic Key Pre-distribution for Heterogeneous Mobile Ad hoc Networks Using Subjective Logic" IEEE Computer Society, Apr. 2015, pp. 185-192.

Extended European Search Report for Application No. 22386057.8 dated Jan. 20, 2023. 8 pgs.

Kannan Govindan et al: "Trust Computations and Trust Dynamics in Mobile Ad.hoc Networks: A Survey", IEEE Communications Surveys & Tutorials, IEEE, USA, vol. 14, No. 2, Apr. 1, 2012 (Apr. 1, 2012), pp. 279-298, XP011443396.

Khan Muhammad Saleem et al: "Adaptive Reputation Weights Assignment Scheme for MANETs", 2016 IEEE Trustcom/Bigdatase/ISPA, IEEE, Aug. 23, 2016 (Aug. 23, 2016), pp. 160-167, XP033063322, DOI: 10.1109/Trustcom.20 16.0059.

Bhargava Arpita et al:"KATE: Kalman Trust Estimator for Internet of Drones", Computer Communications, Elsevier Science PU Blishers BV, Amsterdam, NL, vol. 160, Apr. 22, 2020 (Apr. 22, 2020),pp. 388-401, XP086250779, ISSN: 0140-3664, DOI: 10.1016/J.COMCOM. 2020.04.027.

Ge Chunpeng et al: "A Provenance-Aware Distributed Trust Model for Resilient Unmanned Aerial Vehicle Networks", IEEE Internet of Things Journal, IEEE, USA, vol. 8, No. 16, Aug. 7, 2020 (Aug. 7, 2020), pp. 12481-12489, XP011870549, DOI: 10.1109/JIOT.2020. 3014947.

* cited by examiner

REPUTATION-BASED TRUST DETERMINATION METHOD

FIELD OF THE INVENTION

The present disclosure relates to trust level determination methods in networks in general, and in particular to a reputation-based method for determining a level of trust for mobile entities in ad-hoc networks.

BACKGROUND OF THE INVENTION

Recent advances in Autonomous Systems (AS) have triggered further leaps in Mobile Ad Hoc Networks (MANETs) and relevant solutions. One such prevalent case are Flying Ad Hoc Networks (FANETs), which are expected to reshape today's air mobility models and be the enabler for novel civilian and military applications (e.g., "Save And Rescue" (SAR) missions or military reconnaissance).

Information-Centric Networking, and especially Named Data Networking (NDN), are ideal for meeting the requirements of such applications thanks to provisioning data-centric communication and security by design. The data-centric communication model renders NDN suitable for supporting the operation of mobile networks because it allows for asynchronous data creation and consumption, while the NDN security system ensures data immutability and provenance.

Typically, in NDN, trust relations are established based on public key cryptography and trusted third parties, i.e., premised on Public Key Infrastructure and certificates provided by Central Authorities (CAs). However, such methods normally involve heavy operations, and require continuous connectivity to the stationary infrastructure. In particular, NDN mandates that each content object is signed using the content publisher's certificate. Prior to content consumption, the content consumer needs to retrieve the relevant "trust scheme", so that the consumer can discover and fetch the associated certificate chain, which begins with the signer's certificate and ends at a trusted anchor. Subsequently, the consumer must verify the signatures included in the certificate chain to eventually validate the content. This credential-based security scheme guarantees data integrity and authenticity at the cost of increased computational cost and latency. Furthermore, it also requires continuous connectivity to certificate authorities located in ground network infrastructure. As a result, in cases of highly dynamic networks, such as FANETs, which entail intermittent connectivity as well as ad hoc and short-term communication, the current NDN credential-based approaches may not be suitable for ensuring trust or even lead to operational issues (e.g., in the absence of a networking path to a certificate authority).

BRIEF SUMMARY OF THE INVENTION

An aspect may provide trust establishing methods in dynamic networks to provide fast security assurances with low computational overhead.

According to a first aspect, a method for determining, onboard a first mobile entity, a level of trust for a second mobile entity in communication with the first mobile entity is provided. The method comprises determining, by the first mobile entity, direct trust data based on a number of positive interactions and negative interactions between the second mobile entity and the first mobile entity. The method further comprises calculating, by the first mobile entity, an initial reputation indicator based on the direct trust data. The reputation indicator includes a belief value, a disbelief value, an uncertainty value, and a base trust rate. The method further comprises calculating, by the first mobile entity, a confidence level based on the belief value, the base trust rate, and the uncertainty value, and determining an updated reputation indicator based on the initial reputation indicator and the confidence level. The base trust rate is indicative of the trust level for data transmitted from an unknown mobile entity that has not been in contact with the first mobile entity in the past. A positive interaction is an interaction where the data received from the second mobile entity match defined quality criteria. A negative interaction is an interaction where the data received from the second mobile entity do not match the quality criteria. The updated reputation indicator indicates a level of trust of the first mobile entity in the second mobile entity.

The first and second mobile entities may each be any mobile entity that is in communication with another mobile entity. In particular, the mobile entities may, for example, be unmanned aerial vehicles (UAVs) or other drones or aircrafts. UAVs, for example, often move based on different patterns and encounter each other only opportunistically and for a relatively short period of time. Further, oftentimes, UAVs or other aircrafts may need to interconnect and collaborate to perform specific tasks. Because of the relatively short period of time, however, trust decisions relating to communication links and data exchange between two or more mobile entities must be made very rapidly. Hence, fetching keys and verifying signatures included in associated certificate chains might introduce excessive delay and/or overhead or even become infeasible when access to the infrastructure is not guaranteed.

In order to overcome these issues, the disclosed method is based on comparison of past behaviors of specific collaboration partners (second mobile entities) of the first mobile entity, in order to estimate a level of trust in the specific second mobile entity. The method is particularly useful for "lighter" security scenarios, where strong trust establishment is not necessary. Second mobile entities that have behaved trustworthy in the past are expected to do so in future interactions, too.

The direct trust data corresponds to data about the trustworthiness of second mobile entities that already have interacted with the first mobile entity in the past. The direct trust data may, for example, be a tuple comprising the number of positive interactions $I_p$ and the number of negative interactions $I_n$ between the specific second mobile entity and the first mobile entity, where the subscripts i and j denote the first and second mobile entities:

$$T_{d,ij} = (I_{p,ij}, I_{n,ij}) \qquad (1)$$

However, the direct trust data may be saved in any suitable form and may also be any other suitable data that is indicative of the quality of past interactions. The first mobile entity may save corresponding direct trust data for every second mobile entity it has interacted with in the past in a corresponding memory. Specifically, the positive interactions and the negative interactions may be counters for interactions between the first mobile entity and the second mobile entity for the amount of times interactions have been concluded satisfactory.

If an interaction has been concluded satisfactory may be decided by checking any suitable quality criteria. Such quality criteria may, for example, be the type of data the first mobile entity has received from a second mobile entity in an interaction. For example, the first mobile entity may check if the data it received is damaged or if the first mobile entity received the data it requested. If, for example, the data is in an unrealistic order of magnitude or of a wrong kind for the request made, the first mobile entity may consider the interaction negative. However, this listing is only exemplary and any suitable quality criteria to determine if the interaction is positive or negative may be employed.

The direct trust data may be updated by the first mobile entity every time after an interaction with the specific second mobile entity has occurred. Determining the level of trust for a new interaction with the second mobile entity then starts by reading the current direct trust data from the memory, after the second mobile entity has been identified.

Additionally, as described further below with regard to an embodiment, the method may consider indirect trust data $T_{i,ij}$. Based either on the direct trust data alone or, if applicable, the direct trust data and the indirect trust data, the parameters positive experiences $E_{p,ij}$ and negative experiences $E_{n,ij}$ may be defined. If only direct trust data is used, the parameters positive experiences and negative experiences are the same as the parameters positive interactions and negative interactions, respectively. If, additionally, indirect trust data is used, the parameters positive experiences and negative experiences may be the sum of the positive interactions with the positive recommendations (described further below) and the sum of the negative interactions with the negative recommendations (described further below), respectively.

For the calculation of the initial reputation indicator, statistical probabilities that the second mobile entity is trustworthy (indicated by the belief value), that the second mobile entity is untrustworthy (indicated by the disbelief value), and the corresponding uncertainty of these probabilities are calculated. The belief value $B_{ij}$, the disbelief value $D_{ij}$, and the uncertainty value $\sigma_{ij}$ may, for example, be calculated as follows:

$$B_{ij} = \frac{E_{p,ij}}{E_{p,ij} + E_{n,ij} + c} \quad (2)$$

$$D_{ij} = \frac{E_{n,ij}}{E_{p,ij} + E_{n,ij} + c} \quad (3)$$

$$\sigma_{ij} = \frac{c}{E_{p,ij} + E_{n,ij} + c} \quad (4)$$

The parameter c thereby is a constant value that may, for example, be estimated by a calibration procedure or set according to the requirements. For example, the parameter c may be an integer number, such as c=2. In this case, the first mobile entity starts being trustworthy about the second mobile entity after at least three positive interactions (if zero negative interactions and three positive interactions are present, $B_{ij}$=0.6>0.5). However, this is only one example and other numbers are possible, too.

Based on these parameters, the initial reputation indicator $R_{initial,ij}$ may be defined as follows:

$$R_{initial,ij}=(B_{ij}, D_{ij}, \sigma_{ij}, T_b) \quad (5)$$

wherein $T_b$ is the base trust rate. This base trust rate defines the a-priori confidence (and therefore the trust level) that a second mobile entity is trustworthy if no past data regarding the trustworthiness of this specific second mobile entity exists. The base trust rate may, for example, be a random number in the range between 0 and 1, i.e., $T_b \in [0,1]$. If the base trust rate is, for example, 0.5, it expresses the fact that initially the first mobile entity is neither suspicious nor benevolent towards the second mobile entity (not biased at all). If the base trust rate is between 0.5 and 1, the first mobile entity is biased towards the second mobile entity being benevolent. If it is between 0 and 0.5, the first mobile entity is biased towards being suspicious against the second mobile entity. Optionally, a density function for the random numbers, i.e., a distribution of the random numbers, may be employed which may, for example, be a statistical probability window function representing the statistical probability distribution that a random second mobile entity is trustworthy. By modulating the random numbers by such a window function, basically any probability distribution may be implemented.

In order to account for the uncertainties of the initial reputation indicator, in the next step of the method, a confidence level is calculated based on the belief value, i.e., the probability that the second mobile entity is trustworthy, the base trust rate and the calculated uncertainty. Although the confidence level may be calculated in any suitable way, by way of example it may be calculated as follows:

$$C_{ij}=B_{ij}+T_b \cdot \sigma_{ij} \quad (6)$$

The initial reputation indicator may then be updated using the confidence level, in order to get a more precise reputation indicator that accurately describes the probability that the second mobile entity is trustworthy, i.e., that it collaborates as desired. The initial reputation indicator may be updated in any suitable way, such as by means of exponentially weighted moving average function (as described further below) or any other suitable average function or other function.

Based on the updated reputation indicator, the first mobile entity gets an accurate estimation about the trustworthiness of the second mobile entity without having to employ signature methods with high computational overhead. Further, since the level of trust may be determined based on data collected by the first mobile entity only, and, e.g., not relying on data from ground stations, such as is the case for trust relations based on public key cryptography and trusted third parties, a level of trust in another mobile entity may be determined at any instance in time without relying on data from other entities. Based on the determined level of trust, the first mobile entity may decide whether to cooperate with the second mobile entity or not.

The above method may be repeated at every encounter or interaction with the specific second mobile entity. Further, because of the predefined base trust rate, the method may still function even if no previous trust data regarding the second mobile entity is present in the memory of the first mobile entity. In this case, the belief value and the disbelief value vanish, and the uncertainty value becomes 1. Therefore, only the base trust rate contributes to the confidence level and to the updated reputation indicator, as is readily apparent from the above equations.

According to an embodiment, the step of calculating the initial reputation indicator further includes calculating the initial reputation indicator based on a summation of indirect trust data with the direct trust data. The indirect trust data corresponds to a number of positive recommendations and negative recommendations relating to the second mobile entity and received from at least one third mobile entity.

The at least one third mobile entity is another mobile entity distinct from the second mobile entity that may have interacted with the second mobile entity in the past and therefore may hold a record about trust data regarding the second mobile entity itself. These indirect trust data therefore correspond to direct trust data of the third mobile entity, i.e., counts of positive interactions and negative interactions of the third mobile entity with the second mobile entity, as described above with regard to the first mobile entity. The third mobile entity may be any mobile entity, such as a drone, that is in communication range with the first mobile entity but does not directly cooperate with the first mobile entity to perform a task. However, since the third mobile entity is in communication range with the first mobile entity, it may share its experiences regarding the second mobile entity with the first mobile entity in the form of positive recommendations and/or negative recommendations.

Similarly as the direct trust data, the indirect trust data may be arranged in a tuple or other suitable data format comprising the number of positive recommendations $R_{p,ij}$ and the number of negative recommendations $R_{n,ij}$ for interactions between the specific second mobile entity and the first mobile entity (corresponding to the number of positive interactions and negative interactions between the second mobile entity and the third mobile entity (indicated by the subscript k)), where the subscripts i and j again denote the first and second mobile entities:

$$T_{i,j} = (R_{p,ij}, R_{n,ij}) = \sum_k (R_{p,ijk}, R_{n,ijk}) \qquad (7)$$

The summation over the subscript k (corresponding to different third mobile entities) indicates the summation of the recommendations from different third mobile entities to get an overall recommendation from any available third mobile entities.

As briefly indicated further above, if such indirect trust data is available, these data are considered in the parameters positive experiences $E_{p,ij}$ and negative experiences $E_{n,ij}$. In particular, the positive experiences and the negative experiences may then be defined as follows:

$$E_{ij} = (E_{p,ij}, E_{n,ij}) = (I_{p,ij}, I_{n,ij}) + \sum_k (R_{p,ijk}, R_{n,ijk}) \qquad (8)$$

with, for example, $$\sum_k (R_{p,ijk}, R_{n,ijk}) = \sum_k (I_{p,jk}, I_{n,jk}) \qquad (9)$$

since the recommendation for an interaction between the first mobile entity (subscript i) and the second mobile entity (subscript j) from a third mobile entity may correspond to the direct trust data for interactions between the second mobile entity with one of the third mobile entities (subscript k). However, the recommendations form the third mobile entities may also be determined in any other suitable way. In other words, when other (third) mobile entities which have interacted with the specific second mobile entity with which the first mobile entity wants to interact are in the vicinity of the first mobile entity (within communication range), these third mobile entities can share their direct trust data regarding the second mobile entity with the first mobile entity. These direct trust data from all of such available third mobile entities is added to the direct trust data the first mobile entities has acquired itself, to get the overall number of positive and negative experiences with the specific second mobile entity. Further, the positive recommendations and the negative recommendations may also be weighed according to the trust in the third mobile entities. If, for example, one third mobile entity is more trustworthy than another third mobile entity, the recommendations from the third mobile entity having the higher reputation is assigned a greater weight.

In this way, the number of data points and therefore the statistics and the reliability of the determination of the level of trust in the second mobile entity is improved. The remainder of the method stays the same as described further above.

According to another embodiment, the positive recommendations and the negative recommendations correspond to positive interactions and negative interactions, respectively, that have been determined by the at least one third mobile entity that has interacted with the second mobile entity in the past.

According to another embodiment, the method further comprises periodically broadcasting, by the first mobile entity, an interest packet to fetch indirect trust data from the at least one third mobile entity.

Such an interest packet may be a data packet that is periodically sent to the surroundings of the first mobile entity and that indicates interest in trust data regarding the second mobile entity. Third mobile entities in communication range with the first mobile entity may receive the interest packet and may in response, as described above, share their available trust data regarding the second mobile entity with the first mobile entity.

According to another embodiment, the step of determining the updated reputation indicator further includes applying an exponentially weighted moving average function (EWMA) on the initial reputation indicator and the confidence level.

Application of such an exponentially weighted moving average function may be defined by the following equation $$R_{updated,ij} = w \cdot R_{initial,ij} + (1-w) \cdot C_{ij} \qquad (10)$$

where w is a weighing factor. As is readily apparent, using such an exponentially weighted moving average function for the updated reputation indicator (which corresponds to the level of trust determined for the second mobile entity), the newest data can be given more weight than data from further in the past. Even if the second mobile entity has been trustworthy in the past, this may not necessarily be the case now. Giving the newest data the highest weight accounts for such changes since the current trustworthiness is the most important one.

According to another embodiment, the communication between the mobile entities is based on named data networking, NDN.

Information-Centric Networking, and especially Named Data Networking (NDN), are ideal for meeting the requirements of FANET applications and other mobile Ad Hoc Networks thanks to provisioning data-centric communication and security by design. In particular, secure identification of the participating devices is already implemented in NDN, so that no additional identification of the mobile entities is necessary when in communication with each other. The data-centric communication model renders NDN suitable for supporting the operation of mobile networks because it allows for asynchronous data creation and consumption, while the NDN security system ensures data immutability and provenance. However, in NDN, trust relations are usually established based on public key cryptography and trusted third-parties, which involve heavy computing operations and therefore high computational overhead. The disclosed method allows for utilizing the advantages of NDN over other networking architectures while keeping computational overhead low. In particular, by establishing trust relations based on reputation of the communication partner (instead of public cryptography), not every submitted data packet has to be verified. This, in particular, allows for safe communication even when the contact duration between the first mobile entity and the second mobile entity is very short, as is, for example, usually the case in operations performed by collaborating drones.

According to another embodiment, the step of determining the updated reputation indicator further comprises including a global reputation score, GRS, received from a ground station.

Fixed ground stations may, as described below, determine own levels of trust (global reputation score, GRS) for mobile entities that may be shared with mobile entities in communication range to the ground station. The first mobile entity, in turn, may use the received GRS from the ground station and consider it in determining the level of trust for a second mobile entity and therefore in decision making.

According to another embodiment, the GRS is a reputation score determined by the ground station based on trust data received from mobile entities in communication range to the ground station.

The ground station may execute the same method as the first mobile entity, if any mobile entity comes within communication range with the ground station, and may determine and store a level of trust for each such mobile entity. In this case, the ground station performs the actions described above with regard to the first mobile entity. In particular, the ground station may receive any available positive and negative recommendations from any mobile entities and may also determine direct trust data regarding such mobile entities within reach.

However, it is also conceivable that the ground station only relays the available trust data to mobile entities within reach without performing the method/determination of the levels of trust itself. A first mobile entity may then use the relayed trust data in determining the level of trust (for example as recommendations, as described above), thereby improving its statistics.

According to another embodiment, the GRS predominates the reputation indicator if the GRS and the updated reputation indicator determined onboard the first mobile entity without the GRS do not match.

Because the ground station is at a fixed position on the ground, it is expected to have much more encounters with mobile entities than the mobile entities with each other. Therefore, the ground station will have much more data points available for determining the trust levels of the mobile entities. If the first mobile entity detects a considerable mismatch between a level of trust for a second mobile entity calculated onboard the first mobile entity and the level of trust (GRS) received from the ground station, the ground station data is preferred because it most likely is more accurate because of the larger data set. In other words, the GRS from the ground station acts as confirmatory evidence about the level of trust in a second mobile entity.

According to another embodiment, the method further comprises periodically checking for ground stations in communication range with the first mobile entity and, if a ground station is in communication range, broadcasting an interest packet to fetch a global reputation score from said ground station.

Similarly to broadcasting interest packages to third mobile entities by the first mobile entity, the first mobile entity may periodically send such interest packages to ground stations within reach. In order to check for available ground stations, the first mobile entity may, for example, have the locations of available ground stations stored in memory. By comparing the stored positions with the actual position of the first mobile entity, the first mobile entity may decide if at least one of the stored ground stations is in reach and may start broadcasting the interest package. However, the first mobile entity may also just broadcast the interest package without first checking for available ground stations and may consider the GRS if it receives one from a known ground station.

According to another embodiment, each of the mobile entities is an aerial vehicle.

Such an aerial vehicle may for example be an airplane, UAV, or other civilian or military drone, a helicopter or any other aerial vehicle.

According to a second aspect, a communication system onboard a first mobile entity is provided. The communication system comprises a transceiver, configured to send and receive data messages wirelessly, and a controller, configured to determine a level of trust for a second mobile entity in communication with the first mobile entity. The determination of the level of trust is performed by determining direct trust data corresponding to a number of positive interactions and negative interactions between the second mobile entity and the first mobile entity, by calculating an initial reputation indicator based on the direct trust data, wherein the reputation indicator includes a belief value, a disbelief value, an uncertainty value, and a base trust rate. The determination is further performed by calculating a confidence level based on the belief value, the base trust value, and the uncertainty value, and by determining an updated reputation indicator based on the initial reputation indicator and the confidence level. The base trust rate is indicative of the trust level for data transmitted from an unknown mobile entity that has not been in contact with the first mobile entity in the past. Each of the positive interactions corresponds to an interaction where the data received from the second mobile entity match defined quality criteria. Each of the negative interactions corresponds to an interaction where the data received from the second mobile entity do not match the quality criteria. The updated reputation indicator indicates a level of trust of the first mobile entity in the second mobile entity.

The controller of the communication system may, for example, be a general-purpose computer having a CPU and memory components, an ASIC, FPGA, or any other suitable computation device and is configured to execute the method described above. The method thereby may be implemented according to any one of the embodiments described above. The transceiver acts to receive and send data such as payload data as well as interest packets, trust data and any other data.

In summary, the present disclosure provides a security or trust layer for communication between mobile entities such as drones or other aerial vehicles having a low computational overhead. The disclosed reputation-based trust-establishing mechanism provides a fast and light-weight method to ensure trusted communication, in particular in the context of an NDN-based FANET. Regarding trust decisions, the time needed to determine whether to trust another mobile entity, such as an UAV, based on its reputation indicator is considerably lower than the respective time needed to execute a signature verification. Further, the proposed reputation-based method can still be leveraged to establish trust among UAVs even if there is no connection to the ground-based infrastructure or even if the mobile entities have never met or collaborated before. Optionally, trust data from the ground-based infrastructure or other mobile entities may nevertheless be employed to improve accuracy of the determined level of trust.

BRIEF DESCRIPTION OF THE DRAWINGS

In the following, exemplary embodiments are described in more detail having regard to the attached figures. The illustrations are schematic and not to scale. Identical reference signs refer to identical or similar elements. The figures show.

DETAILED DESCRIPTION

Figure 1:
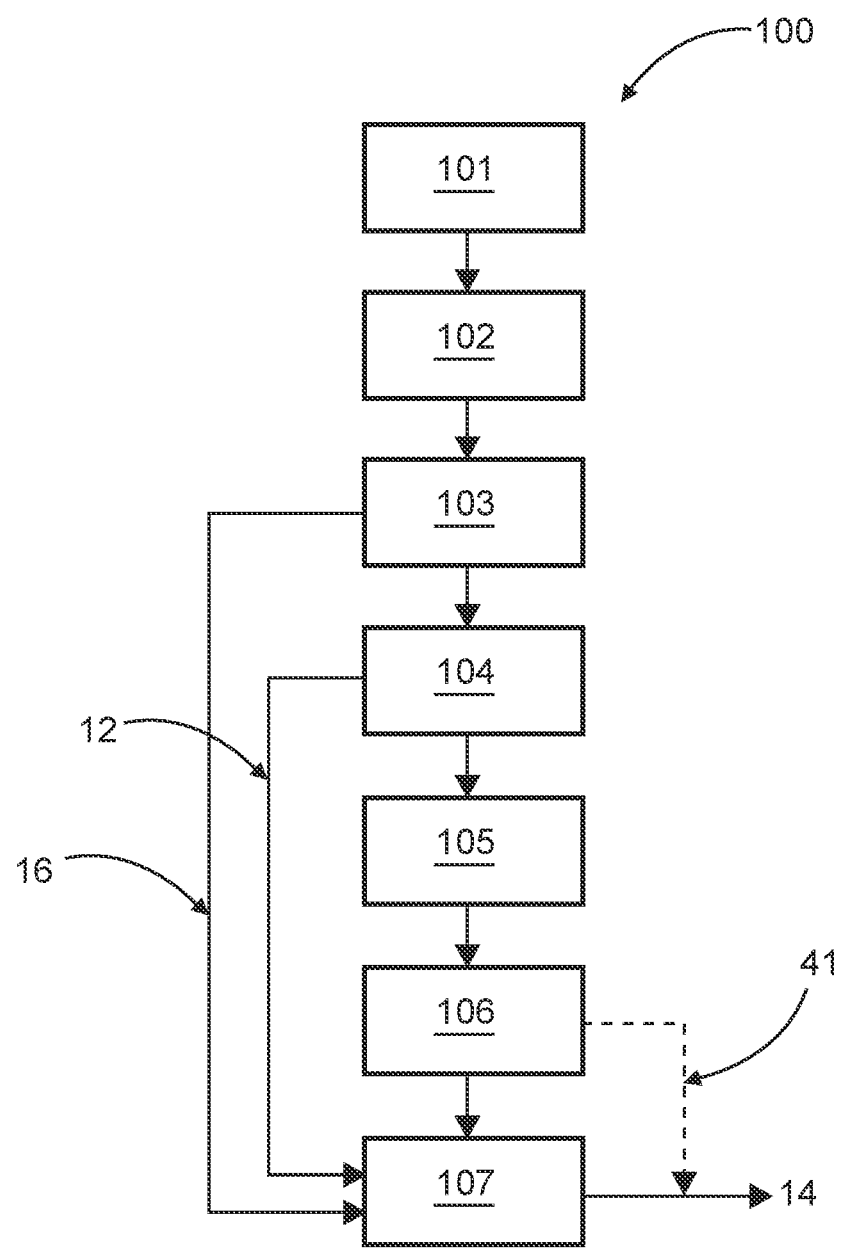
FIG. 1 a flow diagram of a method for determining a level of trust for a second mobile entity onboard a first mobile entity.
Figure 2:
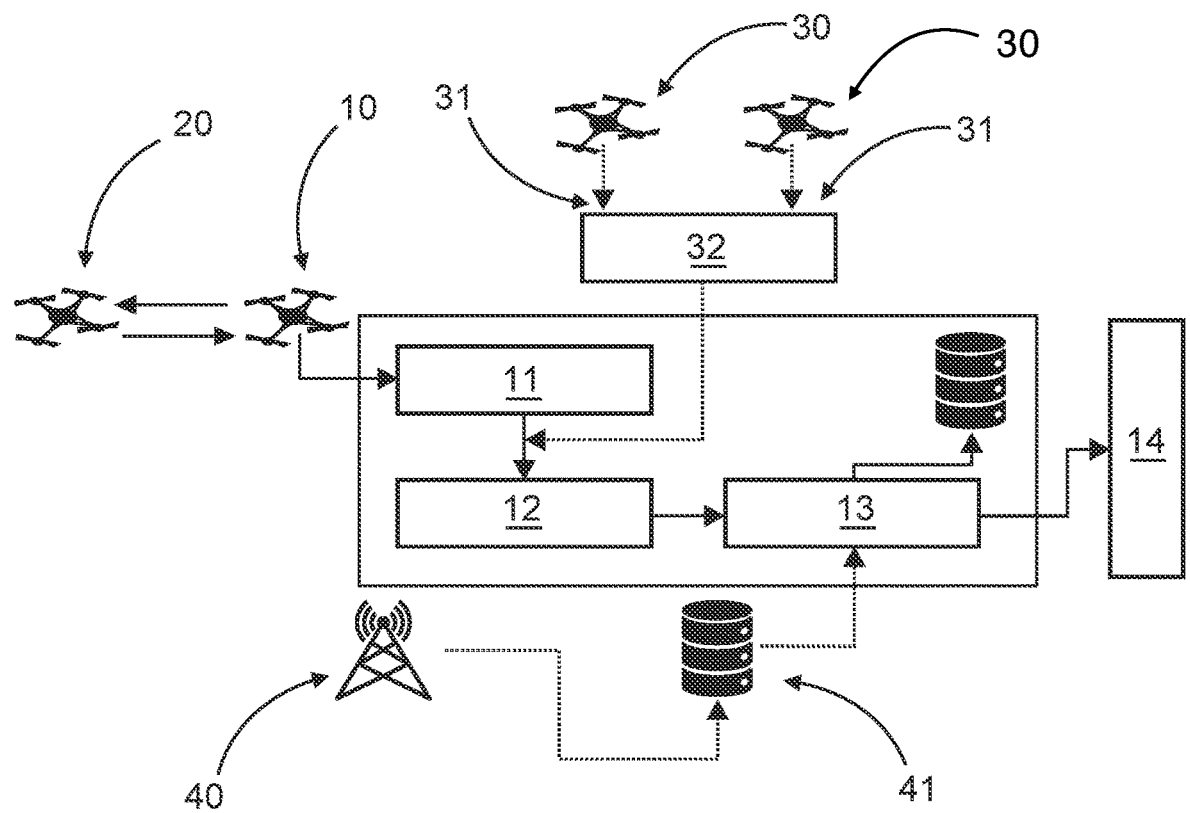
FIG. 2 a schematic of an arrangement of mobile entities, embodied as UAVs, and the corresponding data flows while implementing the method of FIG. 1.

FIG. 1 shows a flow diagram of a method 100 for determining a level of trust 14 for a second mobile entity 20 that is in communication with a first mobile entity 10 and collaborates in performing a task. FIG. 2 shows the data flows within the method 100 of FIG. 1 as well as the physical arrangement and connections between the mobile entities and a ground station 40. In the following, the FIGS. 1 and 2 will be described in conjunction. In FIG. 2, a first mobile entity 10 is in wireless communication with a second mobile 20 entity as well as with two third mobile entities 30. The third mobile entities 30 are mobile entities that do not actively collaborate in performing the specific task of the first mobile entity 10 and the second mobile entity 20.

The method 100 starts in step 101 with determining direct trust data 11 by the first mobile entity. The direct trust data 11 correspond to a number of positive and negative interactions between the first mobile entity 10 and the second mobile entity 20 that occurred in the past. Every time, the first mobile entity 10 and the second mobile entity 20 interact with each other, the first mobile entity 10 decides, whether the interaction is to be rated as positive or negative.

An interaction may be deemed to be positive or negative depending on the existence or the absence of specific quality criteria, which can be indicative of misbehavior or otherwise untrustworthy behavior of the second mobile entity 20. By considering those quality criteria, the first mobile entity 10 follows a decision tree-like model to decide whether the interaction should be rated positively or negatively. For instance, by observing a large number of pending interests and a high incoming interest rate originating from a specific mobile entity along with a high number of unsatisfied interests, the first mobile entity 10 may conclude that the second mobile entity 20 is a potential interest flooding attacker. On the other hand, a low response time and content received cross checked with data received by others (for example by other mobile entities) might be attributes of a trustworthy collaborator. It should be noted that these are only examples of quality criteria and the specific quality criteria to be considered have to be selected according to the use case to accurately identify misbehaving parties.

The positive interactions and the negative interactions between the first mobile entity 10 and the second mobile entity 20 may, for example, be counted and stored in tuples or in other suitable data formats by the first mobile entity 10.

The method 100 may then proceed with optional step 102 with periodically broadcasting an interest packet 15 (see FIG. 3) to third mobile entities 30 in the vicinity. The interest packet 15 indicates an interest, to receive recommendations 31 about the trustworthiness of the second mobile entity 20 from other, third mobile entities 30 in the vicinity. Third mobile entities 30 that have interacted with the second mobile entity 20 in the past may then send recommendations 31 (positive or negative) about the trustworthiness of the second mobile entity 20 to the first mobile entity 10. These recommendations 31 are referred to as indirect trust data 32. It should be noted that this step is optional and is not necessary for the method 100 to work.

In step 103, the first mobile entity 10 calculates an initial reputation indicator 16 (not shown in FIG. 2) using the direct trust data 11 and, if applicable, the indirect trust data 32 received from the third mobile entities 30. For example, the positive recommendations 31 may correspond to the number of positive interactions the third mobile entity 30 had with the second mobile entity 20 in the past. The negative recommendations 31 may correspond to the number of negative interactions the third mobile entity 30 had with the second mobile entity 20 in the past. Further optionally, the indirect trust data 32 may be adjusted by applying a weighing factor based on the trustworthiness of the third mobile entity 30 from the perspective of the first mobile entity 10, so that recommendations 31 from third mobile entities 30 having a higher associated level of trust (from the perspective of the first mobile entity 10) are weighed higher. The direct trust data 11 and the indirect trust data 32 together define a total amount of positive and negative experiences, respectively, regarding the second mobile entity 20. The initial reputation indicator 16 includes a belief value (expressing the probability that the second mobile entity 20 is trustworthy), a disbelief value (expressing the probability that the second mobile entity is untrustworthy), an uncertainty value for the belief and disbelief values, and a base trust rate. The base trust rate describes the probability that an unknown mobile entity that had no contact with the first mobile entity 10 in the past is trustworthy, as described further above. The belief value, the disbelief value and the uncertainty value may, for example be calculated according to equations 2 to 4 further above. However, other suitable mathematical models may be employed, too.

In the following step 104, a confidence level 12 is calculated based on the belief value, the base trust rate and the uncertainty value, as described further above with regard to equation 6, in order to account for uncertainties.

In optional steps 105 and 106, the first mobile entity 10 may periodically check for ground stations 40 in communication range with the first mobile entity 10 (step 105) and may periodically broadcast (step 106) an interest packet 15 (see FIG. 3) to available ground stations 40, in order to fetch a global reputation score 41 from the ground station 40. Similarly to the interest packets 15 send to the third mobile entities 30 in optional step 102, the interest packet 15 may indicate an interest to receive a global reputation score 41 regarding the second mobile entity 20 from the corresponding ground station 40. Checking for available ground stations 40 may, for example, be performed by comparing the current position of the first mobile entity 10 with stored positions of known ground stations 40. However, the first mobile entity 10 may also just broadcast the interest packet 15 without first checking for available ground stations 40 and may use the global reputation score if it receives it from a known ground station.

The global reputation score 41 corresponds to a level of trust for known mobile entities 10, 20, 30 that is estimated by the ground stations 40 in the same way as the first mobile entity 10 estimates the level of trust for the second mobile entity 20. In other words, the ground stations 40 may also implement the disclosed method 100.

Since the mobile entities 10, 20, 30 and the ground stations 40 preferably communicate using a named data network protocol (NDN), safe identification of the participant is already inherently implemented.

Finally, in step 107, the first mobile entity 10 determines an updated reputation indicator 13 based on the initial reputation indicator 16 calculated in step 103 and the confidence level 12 calculated in step 104. This updating may, preferably (as described further above) be done by means of an exponentially weighed moving average function, as indicated by equation 10 further above. Such a exponentially weighed moving average function assigns the newest reputation data the highest weight, so that the updated reputation indicator 13 is always kept updated while still considering older experiences with the second mobile entity 20. When no global reputation score 41 is available, i.e., when steps 105 and 106 are either not implemented or do not result in usable data, the updated reputation indicator 14 determined by the first mobile entity 10 is the determined level of trust for the second mobile entity 20. If a global reputation score (GRS) is available, the GRS is further taken into account in evaluating the level of trust 14. In particular, if a considerable mismatch between the updated reputation indicator 14 and the global reputation score exists, the global reputation indicator 41 takes precedent over the locally determined updated reputation indicator 13, since it is assumed that the ground stations 40 provides a larger data set, thereby providing a more accurate result. The so determined level of trust 14 may then be used by the first mobile entity 10 in decision making whether to trust the second mobile entity 20 or not.

The method 100 provides a fast method for trust establishment with low computational overhead that is in particular useful for collaborations of mobile entities 10, 20, 30 with low encounter times, such as in many kinds of UAV missions.

Figure 3:
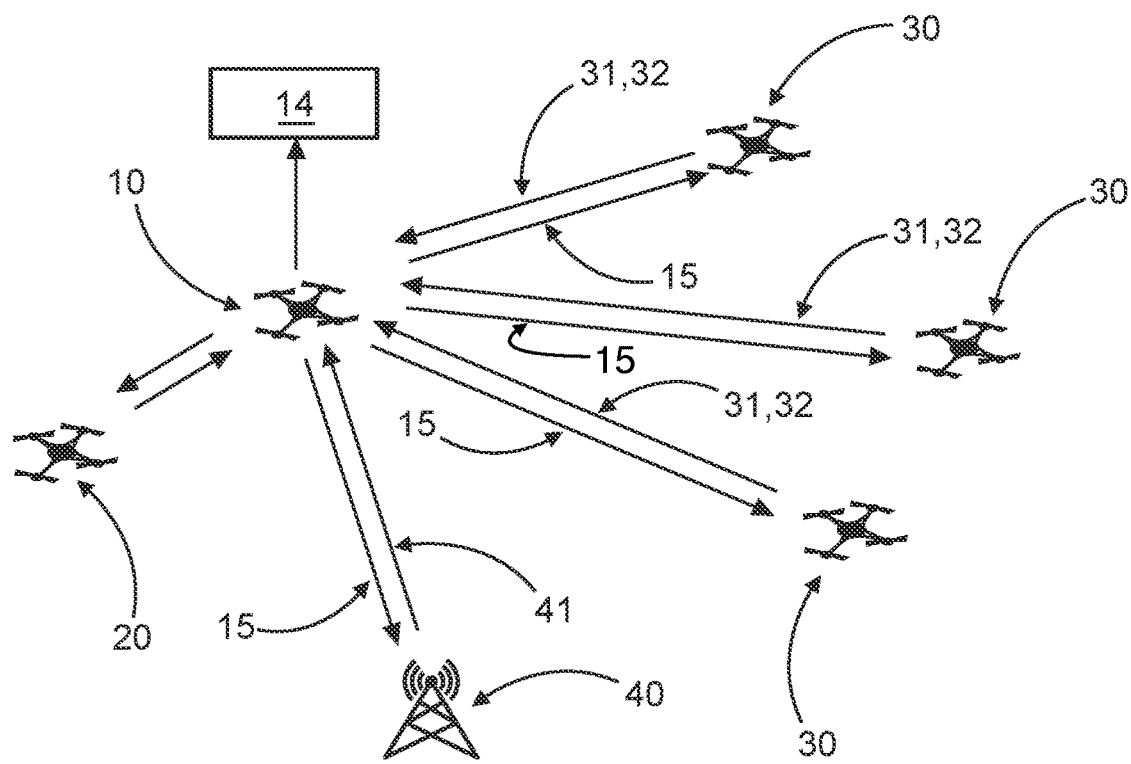
FIG. 3 a schematic diagram illustrating signal/message flows between mobile entities and a ground station.

FIG. 3 briefly indicates the signal path between the participants of the method 100. The first mobile entity 10 is in collaborative communication with the second mobile entity 20, as indicated by arrows between those two mobile entities 10, 20. The first mobile entity 10 sends broadcasts interest packets 15 to three third mobile entities 30 and to a ground station 40 in communication range. In response, the third mobile entities 30 send recommendations 31 (corresponding to indirect trust data 32) back to the requestor (first mobile entity 10). The ground station 40 sends the globally computed global reputation score regarding the second mobile entity 20 back to the first mobile entity 10. The first mobile entity 10 may then used the determined data to determine a level of trust 14 for the second mobile entity 20, using the method 100 described with regard to FIGS. 1 and 2.

It should be noted that "comprising" or "including" does not exclude other elements or steps, and "one" or "a" does not exclude a plurality. It should further be noted that features or steps that have been described with reference to any of the above embodiments may also be used in combination with other features or steps of other embodiments described above. Reference signs in the claims are not to be regarded as limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 first mobile entity
11 direct trust data
12 confidence level
13 updated reputation indicator
14 level of trust
15 interest packet
16 initial reputation indicator
20 second mobile entity
30 third mobile entities
31 recommendations
32 indirect trust data
40 ground station
41 global reputation score (GRS)
100 method for determining a level of trust
101 determining direct trust data
102 broadcasting interest packet to third mobile entities
103 calculating initial reputation indicator
104 calculating confidence level
105 checking for ground stations
106 broadcasting interest packet to ground station
107 determining updated reputation indicator
200 communication system
210 transceiver

The invention claimed is:

1. A method for determining, onboard a first mobile entity, a level of trust for a second mobile entity in communication with the first mobile entity, the method comprising:
   determining, by the first mobile entity, direct trust data based on a number of positive interactions and negative interactions between the second mobile entity and the first mobile entity;
   calculating, by the first mobile entity, an initial reputation indicator based on the direct trust data, wherein the initial reputation indicator includes a belief value, a disbelief value, an uncertainty value, and a base trust rate;
   calculating, by the first mobile entity, a confidence level based on the belief value, the base trust rate, and the uncertainty value; and
   determining an updated reputation indicator based on the initial reputation indicator and the confidence level;
   wherein the base trust rate is indicative of the trust level for data transmitted from an unknown mobile entity that has not been in contact with the first mobile entity in the past;
   wherein a positive interaction is an interaction where the data received from the second mobile entity match defined quality criteria;

wherein a negative interaction is an interaction where the data received from the second mobile entity do not match the quality criteria; and wherein the updated reputation indicator indicates a level of trust of the first mobile entity in the second mobile entity.

2. The method of claim 1, wherein the step of calculating the initial reputation indicator further includes calculating the initial reputation indicator based on a summation of indirect trust data with the direct trust data;

wherein the indirect trust data corresponds to a number of positive recommendations and negative recommendations relating to the second mobile entity and received from at least one third mobile entity.

3. The method of claim 2, wherein the positive recommendations and the negative recommendations correspond to positive interactions and negative interactions, respectively, that have been determined by the at least one third mobile entity that has interacted with the second mobile entity in the past.

4. The method of claim 2, further comprising periodically broadcasting, by the first mobile entity, an interest packet to fetch indirect trust data from the at least one third mobile entity.

5. The method of claim 1, wherein the step of determining the updated reputation indicator further includes applying an exponentially weighted moving average function (EWMA) on the initial reputation indicator and the confidence level.

6. The method of claim 1, wherein the communication between the mobile entities is based on named data networking (NDN).

7. The method of claim 1, wherein the step of determining the updated reputation indicator further comprises including a global reputation score (GRS) received from a ground station.

8. The method of claim 7, wherein the GRS is a reputation score determined by the ground station based on trust data received from mobile entities in communication range to the ground station.

9. The method of claim 7, wherein the GRS predominates the reputation indicator if the GRS and the updated reputation indicator determined onboard the first mobile entity without the GRS do not match.

10. The method of claim 7, further comprising periodically checking for ground stations in communication range with the first mobile entity and, if a ground station is in communication range, broadcasting an interest packet to fetch a global reputation score from said ground station.

11. The method of claim 1, wherein each of the mobile entities is an aerial vehicle.

12. A communication system onboard a first mobile entity, the communication system comprising:

a transceiver, configured to send and receive data messages wirelessly; and a controller, configured to determine a level of trust for a second mobile entity in communication with the first mobile entity by:

determining direct trust data based on a number of positive interactions and negative interactions between the second mobile entity and the first mobile entity;

calculating an initial reputation indicator based on the direct trust data, wherein the initial reputation indicator includes a belief value, a disbelief value, an uncertainty value, and base trust rate;

calculating a confidence level based on the belief value, the base trust value, and the uncertainty value; and determining an updated reputation indicator based on the initial reputation indicator and the confidence level;

wherein the base trust rate is indicative of the trust level for data transmitted from an unknown mobile entity that has not been in contact with the first mobile entity in the past;

wherein a positive interaction is an interaction where the data received from the second mobile entity match defined quality criteria;

wherein a negative interaction is an interaction where the data received from the second mobile entity do not match the quality criteria; and wherein the updated reputation indicator indicates a level of trust of the first mobile entity in the second mobile entity.

* * * * *